United States Patent [19]
Sacchettini et al.

[11] Patent Number: 5,735,766
[45] Date of Patent: Apr. 7, 1998

[54] CENTER DIFFERENTIAL FOR FOUR-WHEEL DRIVE VEHICLES

[75] Inventors: Paolo Sacchettini; Makoto Nishiji, both of La Louviere, Belgium

[73] Assignee: Zexel Corporation, Tokyo, Japan

[21] Appl. No.: 625,006

[22] Filed: Mar. 29, 1996

[30] Foreign Application Priority Data

Mar. 29, 1995 [JP] Japan .................... 7-096186

[51] Int. Cl.$^6$ .................................... F16H 1/06
[52] U.S. Cl. .................................... 475/249
[58] Field of Search ........................ 475/249, 252

[56] References Cited

U.S. PATENT DOCUMENTS

| | | | |
|---|---|---|---|
| 5,147,252 | 9/1992 | Mace et al. | 475/252 |
| 5,415,601 | 5/1995 | Cilano | 475/252 |
| 5,529,547 | 6/1996 | Okuda et al. | 475/252 |
| 5,599,250 | 2/1997 | Nakajiima et al. | 475/252 |
| 5,647,815 | 7/1997 | Bowerman et al. | 475/252 |

FOREIGN PATENT DOCUMENTS

63-38586  8/1982  Japan.
1-303339  7/1989  Japan.

*Primary Examiner*—Dirk Wright

[57] ABSTRACT

In a disclosed center differential, a front sun gear and a rear sun gear are received within a housing such that they are coaxial with a rotational axis of the housing. The pair of sun gears have helical teeth respectively. The helical teeth of the rear sun gear is helically twisted in a direction for generating a force for urging the rear sun gear toward a rear end wall of the housing when the vehicle makes a turn in its coast driving mode. A front friction generating mechanism is interposed between the front end wall of the housing and the front sun gear, and a rear friction generating mechanism is interposed between the rear end wall of the housing and the rear sun gear. A friction torque transmitted between the housing and the rear sun gear through the rear friction generating mechanism when the vehicle makes a turn in its coast driving mode is larger than a friction torque transmitted between the housing and the front sun gear through the front friction generating mechanism.

11 Claims, 4 Drawing Sheets

Fig.12

CENTER DIFFERENTIAL FOR FOUR-WHEEL DRIVE VEHICLES

BACKGROUND OF THE INVENTION

This invention relates to a center differential for four-wheel drive vehicles.

In general, in a four-wheel drive vehicle, a drive torque of an engine is transmitted to front wheels and rear wheels via a center differential, a front output shaft and a rear output shaft, and therefore, a high traveling stability can be obtained.

When the four-wheel drive vehicle makes a turn in a coast driving mode, there is a possibility that a tack-in phenomenon occurs. The expression "coast driving mode" used here refers to a driving mode in which a braking torque for reducing the speed of the vehicle is transmitted from the engine to the wheels as when a depressing amount of an acceleration pedal is reduced to cause an engine brake. Similarly, the expression "tack-in phenomenon" used here refers to a phenomenon in which the rear wheels slip out of a turning circle of the vehicle. Generally speaking, this slip occurs when the forces applied to the wheels exceed respective limit values (threshold values) of friction. These limit values of friction are determined by loads applied to the wheels and coefficient of friction between the wheels and the road surface.

The tack-in phenomenon will be described in more detail next. The force applied to the wheels when the vehicle makes a turn in its coast driving mode is obtained by a combination of a braking force and a centrifugal force. The breaking force is caused by a braking torque from the engine and directed in a proceeding direction of the vehicle. The centrifugal force is applied to the wheels as the vehicle turns and directed in a direction generally perpendicular to the proceeding direction of the vehicle. In the coast driving mode, i.e., in a reduced speed state of the vehicle, a load of the vehicle to be shouldered on the front wheels becomes large and therefore, the limit value of friction with respect to the front wheels becomes large. On the other hand, the load of the vehicle to be shouldered on the rear wheels becomes small and therefore, the limit value of friction becomes small. As a consequence, the forces applied to the rear wheels are easy to exceed the limit values of friction thereby increasing the possibility to cause slip of the rear wheels.

In general, in a torque distributor type center differential, a braking torque to the front wheels, which are rotating at a high speed, is increased and a braking torque to the rear wheels, which are rotating at a low speed, is reduced when the vehicle makes a turn in its coast driving mode. For this reason, the force applied to the rear wheels is reduced, thereby suppressing an occurrence of the tack-in phenomenon. In the future, however, it will be required to suppress the occurrence of the tack-in phenomenon in a more positive manner.

As one of the prior arts, there can be listed Japanese Patent Application Laid-Open No. 303339/1989. This Japanese Publication discloses a center differential of the torque distributor type. In this center differential, a first friction generator means installed between one of the sun gears and a housing seems to be different from a second friction generator means installed between the other sun gear and the housing. It also discloses a construction of the first friction generator means having a plurality of frictional interfaces. Moreover, in the above Japanese Publication, there is a description to the effect that a bias ratio can be increased by the center differential. However, the Japanese Publication does not specifically describe a front and rear positional relationship between the pair of sun gears. There is no description as to how the friction torque occurs when the coast driving is undergoing, either.

As another prior art, there can be listed Japanese Patent Publication No. 38586/1988. Also in this Japanese Publication, it seems that a friction generator means installed between one of the sun gears and a housing is different from another friction generator means installed between the other sun gear and the housing. Also, it discloses a construction of the friction generator means having a plurality of frictional interfaces. However, there is no description to the effect that the disclosed differential is used as a center differential. Further, the Japanese Patent Publication does not specifically describe, as in the case with the Japanese Patent Application Laid-Open No. 303339/1989, a front and rear positional relationship between the pair of sun gears. There is no description as to how the friction torque occurs when the coast driving is undergoing, either.

SUMMARY OF THE INVENTION

It is, therefore, an object of the present invention to provide a center differential for four-wheel drive vehicles which is capable of more positively suppressing an occurrence of the tack-in phenomenon when a vehicle makes a turn in its coast driving mode.

According to the present invention, there is provided a center differential for four-wheel drive vehicles comprising:

(a) a housing capable of turning about a rotational axis thereof, the housing having a front end wall and a rear end wall located axially away from each other;

(b) a generally cylindrical front sun gear and a generally cylindrical read sun gear received within the housing such that they are coaxial with the rotational axis, an end portion of a front output shaft extending through the front end wall of the housing being inserted into and spline connected to the front sun gear, an end portion of a rear output shaft extending through the rear end wall of the housing being inserted into and spline connected to the rear sun gear, a pair of the sun gears each having helical teeth, the helical teeth of the rear sun gear being helically twisted in a direction for generating a force for pushing the rear sun gear toward the rear end wall of the housing when a vehicle is in a coast driving mode;

(c) a pair of planetary gears rotatably supported by the housing and engaged respectively with the helical teeth of the pair of sun gears, the pair of planetary gears being in engagement with each other; and (d) front friction generator means interposed between the front end wall of the housing and the front sun gear and rear friction generator means interposed between the rear end wall of the housing and the rear sun gear, a friction torque to be transmitted between the housing and the rear sun gear through the rear friction generator means when the vehicle makes a turn in its coast driving mode being larger than a friction torque which is transmitted between the housing and the front sun gear through the front friction generator means.

DETAILED DESCRIPTION OF THE EMBODIMENTS

Figure 1:
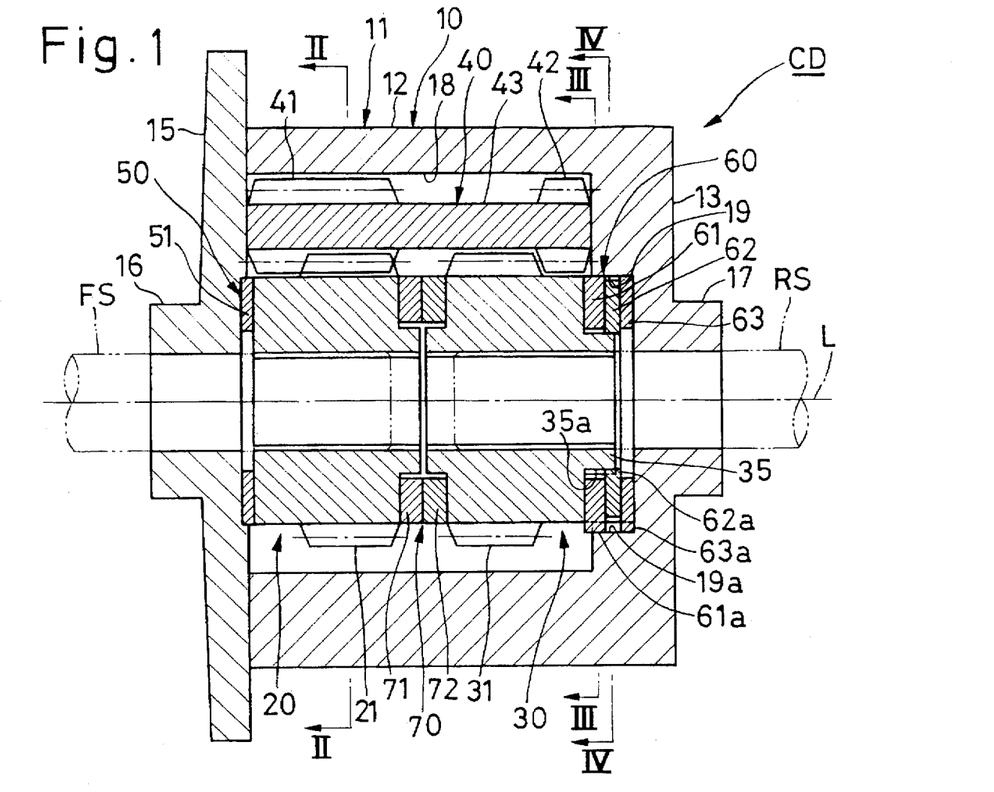
FIG. 1 is a vertical sectional view of a center differential according to a first embodiment of the present invention.

A first embodiment of the present invention will now be described with reference to FIGS. 1 through 9. As shown in FIG. 1, a center differential CD includes a housing 10 which is rotationally driven about a rotational axis L by an engine (not shown). This housing 10 includes a housing body 11 and a disk-like closure 15. The housing body 11 includes a sleeve portion 12 coaxial with the rotational axis L and an end wall 13 (rear end wall) for closing a rear end of the sleeve portion 12. An opening at a front end of the sleeve portion 12 is covered with the closure 15. The closure 15 is provided as a front end wall of the housing 10. Journals 16 and 17 are formed in central portions of the closure 15 and the end wall 13 and extending axially and outwardly, respectively. The journals 16 and 17 are coaxial with the rotational axis L. A front output shaft FS and a rear output shaft RS are inserted respectively into the journals 16 and 17 in a way as to be coaxial with the rotational axis L.

Figure 5:
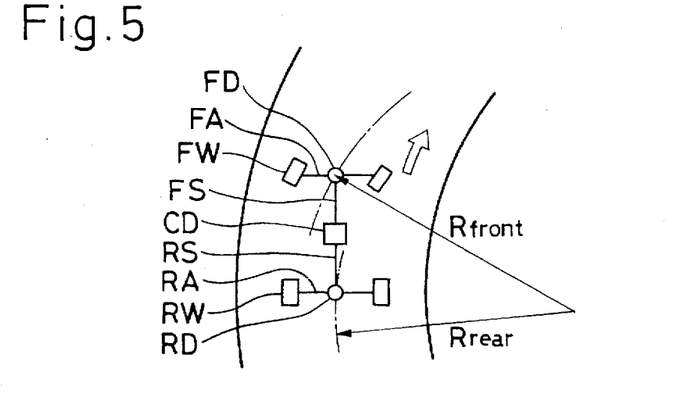
FIG. 5 is a schematic plan view showing a state in which a four-wheel drive vehicle equipped with the center differential is making a turn in its coast driving mode.

As shown in FIG. 5, the front output shaft FS is connected with a pair of front wheels FW through front axles FA, whereas the rear output shaft RS is connected with a pair of rear wheels through a rear differential RD and rear axles RA.

As shown in FIG. 1, a front sun gear 20 and a rear sun gear 30 are received in the housing 10. The sun gears 20 and 30 include helical teeth 21 and 31, respectively. The sun gears 20 and 30 are coaxial with the rotational axis L of the housing 10. The sun gears 20 and 30 are in spline connection with the output shafts FS and RS, respectively.

Figure 2:
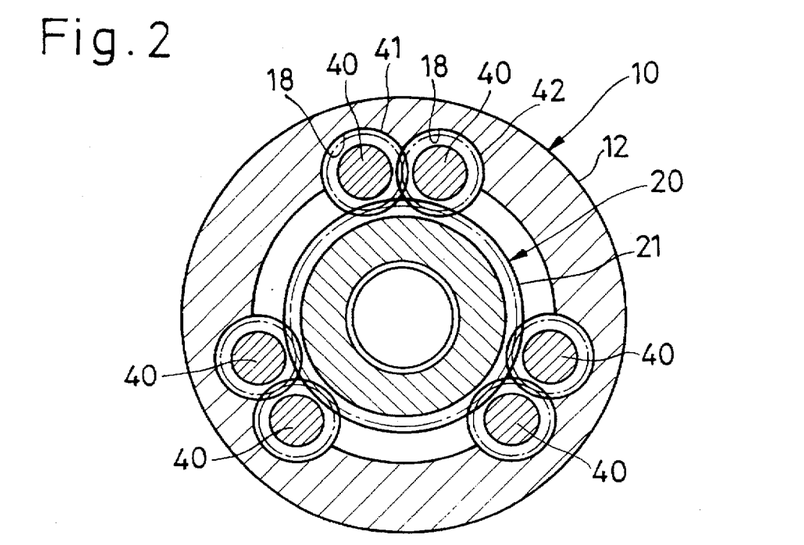
FIG. 2 is a sectional view taken on line II—II of FIG. 1.

As shown in FIG. 2, there are, for example, three pairs of receiving recesses 18 formed in an inner peripheral surface of the sleeve portion 12 of the housing 10 at equal intervals in the circumferential direction. Each receiving recess 18 has a semi-circular shaped configuration in section and extends over an entire length of the sleeve portion 12 in a way parallel to the rotational axis L.

Pairs of planetary gears 40 each having an axis parallel to the rotational axis L are rotatably received within pairs of the receiving recesses 18, respectively. Each planetary gear 40 includes long helical teeth 41 formed on one end portion thereof, short helical teeth 42 formed on the other end portion, and a release portion 43 (portion where no helical teeth are formed) of a reduced diameter formed therebetween. As shown in FIG. 1, one planetary gear 40 in each pair has the long helical teeth 41 disposed on a forward position and the short helical teeth 42 disposed on a rearward position. The other planetary gear 40 likewise has the helical teeth 41 and 42 but these long and short helical teeth 41 and 42 are disposed in a reversed way.

The long helical teeth 41 of the above-mentioned one planetary gear 40 in each pair are in engagement with the helical teeth 21 of the front sun gear 20, whereas the long helical teeth 41 of the other planetary gear 40 are in engagement with the helical teeth 31 of the rear sun gear 30. Further, the long helical teeth 41 of the above-mentioned one planetary gear 40 in each pair are in engagement with the short helical teeth 42 of the other planetary gear 40, whereas the short helical teeth 42 of the above-mentioned one planetary gear 40 are in engagement with the long helical teeth 41 of the other planetary gear 40. As a consequence, the pair of sun gears 20 and 30 are connected with each other through the three pairs of planetary gears 40.

Figure 7:
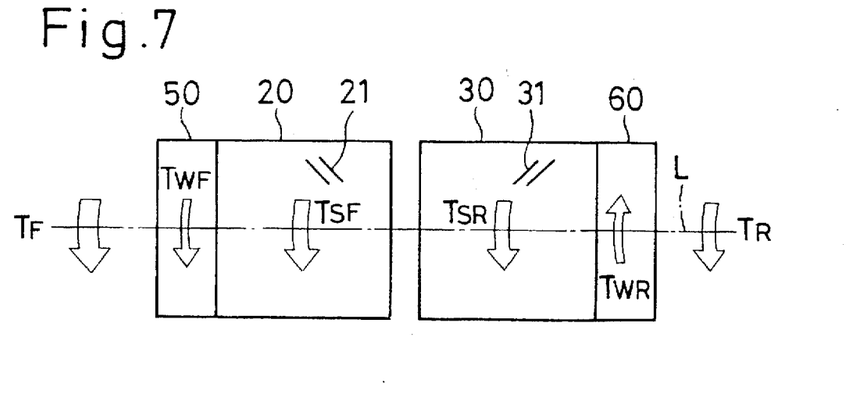
FIG. 7 is a view showing how the torque is applied to a front sun gear and a rear sun gear.

The torque supplied to the housing 10 from the engine is transmitted to the sun gears 20 and 30 through the planetary gears 40 and further to the output shafts FS and RS. At that time, since the sun gears 20 and 30 are in engagement with the planetary gears 40 through the helical teeth 21, 31 and 41, the sun gears 20 and 30 are subjected to force in the direction of the rotational axis L. In this embodiment, as schematically shown in FIG. 7, the helical directions of the helical teeth 21 and 31 of the sun gears 20 and 30 are reversed with each other and moreover, the helical directions are such that the sun gears 20 and 30 are subjected to force for urging the sun gears 20 and 30 to move away from each other, i.e., force toward the closure 15 and the end wall 13 of the housing 10, when the vehicle is in its coast driving mode.

A front friction generator means 50 is interposed between the closure 15 of the housing 10 and the front sun gear 20, a rear friction generator means 60 is interposed between the end wall 13 of the housing 10 and the rear sun gear 30, and an intermediate friction generator means 70 is interposed between the sun gears 20 and 30.

The front friction generator means 50 includes an annular washer 51. Opposite end faces of this washer 51 are in contact with the closure 15 of the housing 10 and the end face of the front sun gear 20. A friction resistance between the first end face of the washer 51 and the closure 15 is larger than that between the second end face of the washer 51 and the front sun gear 20. Accordingly, this washer 51 is rotated in unison with the housing 10 and slidingly contacted with the front sun gear 20 at the time of differential rotation. That is, a frictional interface is formed between the washer 51 and the front sun gear 20.

The rear friction generator means 60 includes three washers 61, 62 and 63 arranged in this order from the rear sun gear 30 toward the end wall 13. These washers have generally equal inner diameters and outer diameters with each other, respectively. The washers 61 and 63 are in engagement with the housing 10, whereas the remaining washer 62 is in engagement with the rear sun gear 30.

Figure 3:
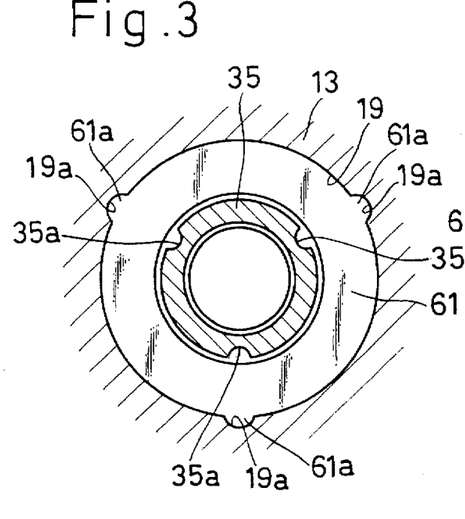
FIG. 3 is an enlarged sectional view of a main portion taken on line III—III of FIG. 1.
Figure 4:
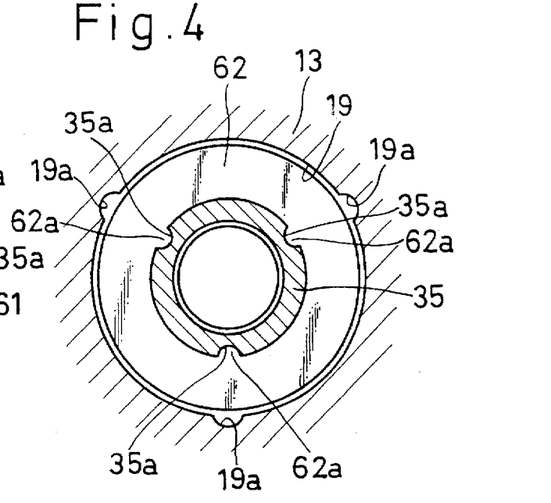
FIG. 4 is an enlarged sectional view of a main portion taken on line IV—IV of FIG. 1.

A construction for engagement of the washers 61, 62 and 63 will now be described in detail. A receiving recess 19 having a circular shaped configuration in section about the rotational axis L is formed in an inner surface of the end wall 13 of the housing 10. As shown in FIGS. 3 and 4, a plurality (three in this embodiment) of engagement recesses 19a are formed in an inner peripheral surface of the receiving recess 19 at equal intervals in a circumferential direction thereof. These engagement recesses 19a extend in parallel relation with the rotational axis L. On the other hand, an annular protrusion 35 of a reduced diameter extending in the axial direction toward the end wall 13 are formed on an end portion on an outer side of the rear sun gear 30. As shown in FIGS. 3 and 4, a plurality (three in this embodiment) of recesses 35a are formed in an outer peripheral surface of the annular protrusion 35 at equal intervals in the circumferential direction.

The washers 61, 62 and 63 are received in the receiving recesses 19, respectively. As shown in FIG. 3, three engagement projections 61a projecting radially outwardly are formed on an outer periphery of the washer 61. The engagement projections 61a come into engagement with the engagement recesses 19a of the housing 10, so that the washer 61 engages the housing 10 in a way movable in the axial direction but unable to rotate. The washer 63 also has the similar engagement projections 63a. The engagement projection 63a are in engagement with the housing 10, so that the washer 63 is movable in the axial direction but unable to rotate. As shown in FIG. 4, three engagement projections 62a projecting radially inwardly are formed on an inner periphery of the washer 62. The engagement projections 62a come into engagement with the engagement recesses 35a of the annular protrusion 35, so that the washer 62 engages the rear sun gear 30 in a way movable in the axial direction but unable to rotate.

Since the washers 61 and 63 are rotated in unison with the housing 10 and the remaining washer 62 is rotated in unison with the rear sun gear 30, frictional interfaces are formed respectively between the washer 61 and the rear sun gear 30, between the washer 61 and the washer 62, and between the washer 62 and the washer 63 at the time of differential rotation, thus occurring slide contacts here. In this way, the rear friction generator means 60 has three frictional interfaces whereas the front friction generator means 50 has only one. Accordingly, a total area of the frictional interfaces of the rear generator means 60 is three times the area of the frictional interface of the front friction generator means 50. Consequently, if other conditions can be disregarded, a friction resistance of three times occurs when a force equal in the axial direction is applied.

An intermediate friction generator means 70 includes two washers 71 and 72. These washers 71 and 72 are designed to be rotated in unison with the sun gears 20 and 30, respectively, and the washers 71 and 72 are slide contacted with each other at the time of differential rotation. It should be noted that when the vehicle is making a turn in its coast driving mode, the sun gears 20 and 30 are urged outwardly along the rotational axis L and therefore, a friction resistance hardly occurs between the washers 71 and 72.

Figure 6:
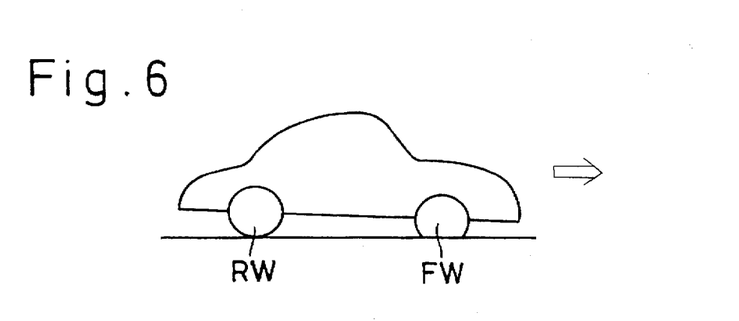
FIG. 6 is a side view showing the four-wheel drive vehicle in its coast driving mode.
Figure 8:
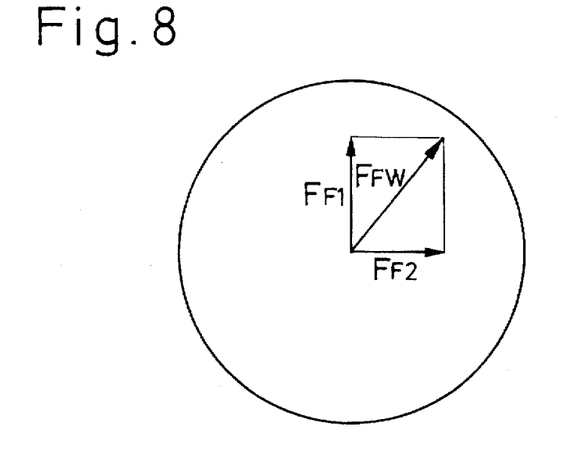
FIG. 8 is a view showing a circle of friction corresponding to front wheels and a force acting on the front wheels when the vehicle makes a turn in its coast driving mode.
Figure 9:
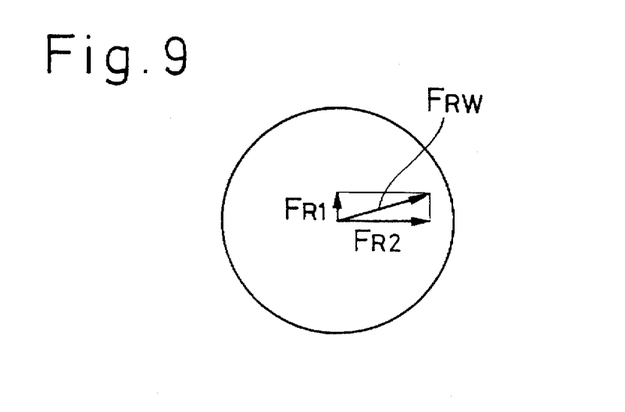
FIG. 9 is a view showing a circle of friction corresponding to rear wheels and a force acting on the rear wheels when the vehicle makes a turn in its coast driving mode.

Operation of the center differential when the vehicle is making a turn in its coast driving mode will now be described. In the coast driving mode, as shown in FIG. 6, the vehicle tends to incline forwardly, and a load caused by the weight of the vehicle acts heavily on the front wheels FW but not so heavily on the rear wheels RW as on the front wheels FW. Accordingly, the friction limit value is large with respect to the front wheels FW but not so large with respect to the rear wheels RW as with respect to the front wheels FW. FIGS. 8 and 9 respectively show the friction limit values in the form of largeness of the radii of circles serving the contact points between the front wheels FW and the road surface and between the rear wheels RW and the road surface as their centers. These circles are hereinafter referred to as the friction circles. If the forces applied to the front wheels FW and the rear wheels RW are smaller than the radii of these circles, no slip occurs but if larger, slip occurs.

Force applied to the wheels FW and RW when the vehicle makes a turn in its coast driving mode will now be described. As shown in FIGS. 8 and 9, the forces $F_{FW}$ and $F_{RW}$ applied to the wheels FW and RW can be obtained by a sum of braking forces $F_{F1}$ and $F_{R1}$ acting in a direction decelerating the vehicle along the traveling direction of the vehicle and centrifugal forces $F_{F2}$ and $F_{R2}$ caused by the turning of the vehicle. The centrifugal forces $F_{F2}$ and $F_{R2}$ acting respectively on the front wheels FW and the rear wheels RW are irrespective of the construction of the center differential and therefore, regarded here as equal with each other for the sake of convenience of explanation. The braking forces $F_{F1}$ and $F_{R1}$ to the wheels are related to the construction of the center differential.

The center differential is requested to increase the braking force $F_{F1}$ to the front wheels FW and to reduce the braking force $F_{R1}$ to the rear RW. The reasons are as follows. As shown in FIG. 8, since the radius of the friction circle is large with respect to the front wheels FW, the braking forces $F_{F1}$ to the front wheels FW are increased and therefore the combined force $F_{FW}$ to the front wheels FW is increased. The combined for $F_{FW}$ is still within the friction circle and no slips occur. On the other side, as shown in FIG. 9, since the radius of the friction circle with respect to the rear wall RW is small, it is required for preventing the rear wheels RW from slipping and for preventing an occurrence of the tack-in phenomenon to reduce the braking force $F_{R1}$ to the rear wheels RW and to reduce the combined force $F_{RW}$ to the rear wheels RW so that the combined force $F_{RW}$ exists within the friction circle.

The braking forces $F_{F1}$ and $F_{R1}$ to the wheels FW and RW correspond respectively to torques $T_F$ and $T_R$ acting on the output shafts FS and RS. As shown in FIG. 7, these torques $T_F$ and $T_R$ are obtained by a sum of the braking torques $T_{SF}$ and $T_{SR}$ applied from the housing 10 to the sun gears 20 and 30 through the planetary gears 40 and the friction torques $T_{WF}$ and $T_{WR}$ generated between the sun gears 20, 30 and the housing 10. The friction torques $T_{WF}$ and $T_{WR}$ are generated by urging the sun gears 20 and 30 outwardly in the coast driving mode. As shown in FIG. 5, since the turning radius Rrear of the rear wheels RW is smaller than the turning radius Rfront of the front wheels FW when the vehicle is making a turn, the rear wheels RW are rotated at a lower speed than the housing 10 and the front wheels FW are rotated at a higher speed than the housing 10. For this reason, in the front output shaft FS, the friction torque $T_{WF}$ is directed in the same direction as the braking torque $T_{SF}$, whereas in the rear output shaft RS, the friction torque $T_{WR}$ is directed in the reversed direction with respect to the braking torque $T_{SR}$. As a consequence, the following equations can be obtained.

$$T_F = T_{SF} + T_{WF}$$

$$T_R = T_{SR} - T_{WR}$$

The torque bias ratio B can be expressed by the following equation.

$$B = T_F/T_R = (T_{SF} + T_{WF})/(T_{SR} - T_{WR})$$

As apparent from the above equation, the torque $T_R$ to the rear wheels RW can be reduced when the vehicle is making a turn in its coast driving state and therefore, the braking force $F_{R1}$ corresponding thereto can be reduced. Accordingly, the tack-in phenomenon can be suppressed. In contrast, the braking torque $T_F$ to the front wheels FW can be increased and therefore, the braking force $F_{F1}$ corresponding thereto can be increased. Accordingly, deceleration of the vehicle can be made positively.

Furthermore, in the center differential of the present invention, the rear friction generator means 60 provided between the housing 10 and the rear sun gear 30 is designed to be able to obtain a large friction resistance due to the three washers 61 through 63. Accordingly, the friction torque $T_{WR}$ can be increased when the vehicle are making a turn in the coast driving mode. Thus, a generation of the tack-in phenomenon can more assuredly be prevented by increasing the torque bias ratio B. In order to increase the torque bias radio B within a limited space, it is more effective to increase the friction torque $T_{WR}$ rather than increasing the friction torque $T_{WF}$.

Figure 10:
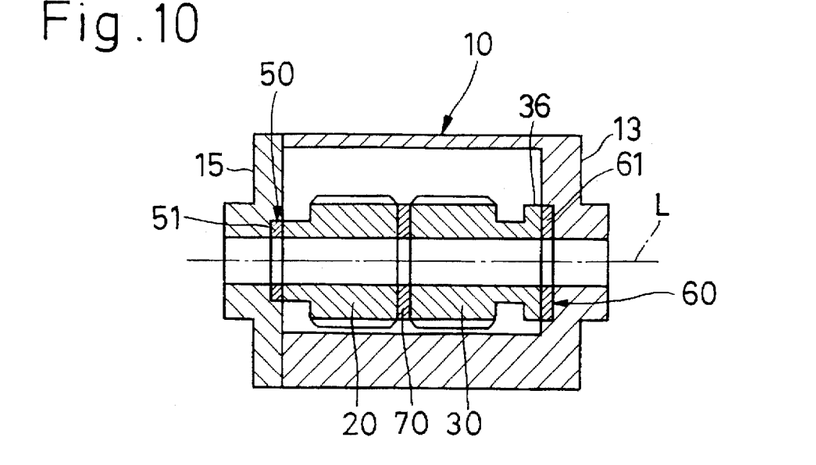
FIG. 10 is a schematic sectional view of a center differential according to a second embodiment of the present invention.
Figure 11:
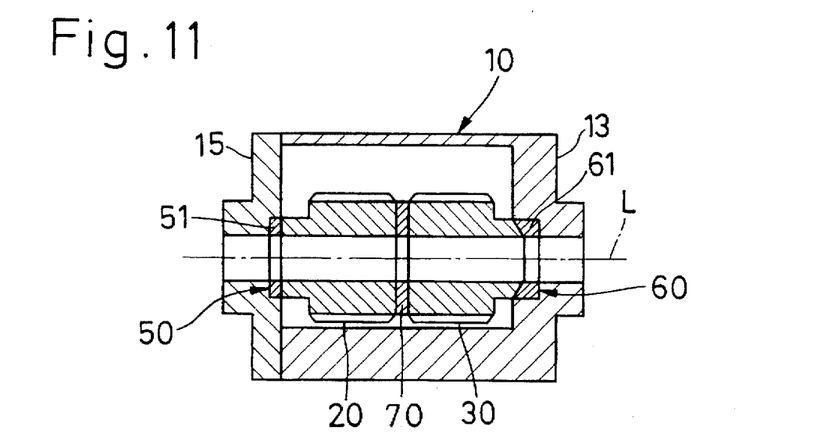
FIG. 11 is a schematic view of a center differential according to a third embodiment of the present invention.
Figure 12:
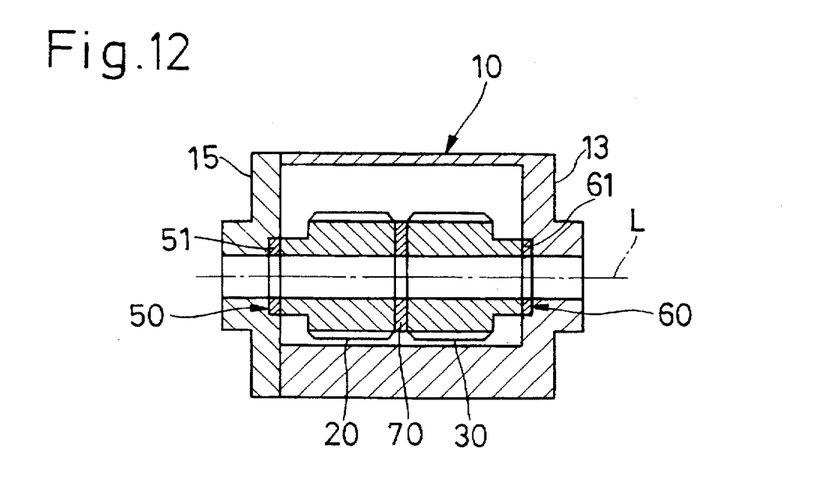
FIG. 12 is a schematic sectional view of the center differential according to a fourth embodiment of the present invention.

FIGS. 10 through 12 show second, third and fourth embodiments of the present invention. In these Figures, the planetary gears are omitted in view of simplicity. In these embodiments, the component parts corresponding to those of the first embodiment will be denoted by identical reference numerals respectively and detailed description thereof is omitted.

In the second embodiment of FIG. 10, a front friction generator means 50 and a rear friction generator means 60 include a washer 51 and a washer 61, respectively. An outer diameter of the rear washer 61 is larger than that of the front washer 51. As the diameter of the rear washer 61 is increased, an enlarged diameter portion 36 having the same diameter as the washer 61 is formed on an external end portion of a rear sun gear 30. Owing to this arrangement, the area of the frictional interface between the rear washer 61 and the rear sun gear 30 can be designed larger than the area of the frictional interface between the front washer 51 and a front sun gear 20. As a consequence, a larger friction resistance can be generated between the housing 10 and the rear sun gear 30 than that between the housing 10 and the front sun gear 20.

In the third embodiment of FIG. 11, a front friction generator means 50 and a rear friction generator 60 have washer 51 and a washer 61, respectively. These washers 51 and 61 are equal in outer diameter and inner diameter with each other. A frictional interface between a rear sun gear 30 and the rear washer 61 is tapered. A frictional interface between a front sun gear 20 and the front washer 51 is a planar surface perpendicular to the rotational axis L. Accordingly, an area of the frictional interface between the rear sun gear 30 and the rear washer 61 is larger than that between the front sun gear 20 and the front washer 51. Accordingly, a larger friction resistance is generated.

In the fourth embodiment of FIG. 12, a front washer 51 and a rear washer 61 are equal in configuration and dimension. At least one of the rear sun gear 30 and the rear washer 61 is provided with a layer (not shown) made of a large friction resistance material. Owing to this arrangement, a coefficient of friction at a frictional interface between the rear sun gear 30 and the rear washer 61 is larger than that at a frictional interface between a front sun gear 20 and a front washer 51. Accordingly, a larger friction resistance can be generated.

As a fifth embodiment, it may be designed such that a helical direction of helical teeth 21 of a front sun gear 20 of FIG. 7 is reversed so as to be the same as the helical teeth 21 of the rear sun gear 30. Owing to this arrangement, both the sun gears 20 and 30 are urged toward an end wall 13 (see FIG. 1) of a housing 10 when the vehicle is in its coast driving mode. When the vehicle is made a turn in its coast driving mode, not only the rear sun gear 30 but also the front sun gear 20 are forced to a rear friction generator means 60. Accordingly, an even greater friction resistance can be generated at the rear friction generator means 60. This can increase the torque bias ratio B.

What is claimed is:

1. A center differential for four-wheel drive vehicles comprising:
    (a) a housing capable of turning about a rotational axis thereof, said housing having a front end wall and a rear end wall located axially away from each other;
    (b) a generally cylindrical front sun gear and a generally cylindrical read sun gear received within said housing such that they are coaxial with said rotational axis, an end portion of a front output shaft extending through said front end wall of said housing being inserted into and spline connected to said front sun gear, an end portion of a rear output shaft extending through said rear end wall of said housing being inserted into and spline connected to said rear sun gear, a pair of said sun gears each having helical teeth, said helical teeth of said rear sun gear being helically twisted in a direction for generating a force for pushing said rear sun gear toward said rear end wall of said housing when a vehicle is in a coast driving mode;
    (c) a pair of planetary gears rotatably supported by said housing and engaged respectively with said helical teeth of said pair of sun gears, said pair of planetary gears being in engagement with each other; and
    (d) front friction generator means interposed between said front end wall of said housing and said front sun gear and rear friction generator means interposed between said rear end wall of said housing and said rear sun gear, a friction torque to be transmitted between said housing and said rear sun gear through said rear friction generator means when the vehicle makes a turn in its coast driving mode being larger than a friction torque which is transmitted between said housing and said front sun gear through said front friction generator means.

2. A center differential for four-wheel drive vehicles according to claim 1, in which said helical teeth of said front sun gear is helically twisted in a reversed way with respect to the rear sun gear in order to generate a force for pushing said front sun gear toward said front end wall of said housing when the vehicle is in the coast driving mode, a friction resistance, which is generated by said rear friction generator means, being larger than a friction resistance which is generated by said front generator means, presuming that said front sun gear and said rear sun gear are pushed with the same force toward corresponding said end walls through corresponding said friction generator means when the vehicle is making a turn in the coast driving mode.

3. A center differential for four-wheel drive vehicles according to claim 2, in which said rear friction generator means is greater in number of frictional interfaces than said front friction generator means.

4. A center differential for four-wheel drive vehicles according to claim 3, in which said front friction generator means includes a single front frictional interface, whereas said rear friction generator means includes a plurality of rear frictional interfaces.

5. A center differential for four-wheel drive vehicles according to claim 4, in which said rear friction generator means includes an annular first washer and an annular second washer, said rear end wall of said housing is formed with a receiving recess for receiving therein said first and second washers, and said rear sun gear is formed with an annular projection having a small diameter and projecting toward said rear end wall, an outer periphery of said first washer being in engagement with an inner periphery of said receiving recess of said housing such that said first washer can move in an axial direction of said rotational axis but it cannot rotate about said rotational axis, an inner periphery of said second washer being in engagement with an outer periphery of said annular projection of said rear sun gear such that said second washer can move in the axial direction of said rotational axis but it cannot rotate about said rotational axis, said first washer being interposed between said second washer and an end face of said rear sun gear.

6. A center differential for four-wheel drive vehicles according to claim 2, in which said front friction generator means and said rear friction generator means include an annular front washer and an annular rear washer respectively, an outer diameter of said rear washer being larger than an outer diameter of said front washer, accordingly, an area of a rear frictional interface formed between said rear washer and said rear sun gear being larger than a front frictional interface formed between said front washer and said front sun gear.

7. A center differential for four-wheel drive vehicles according to claim 2, in which said front friction generator means and said rear friction generator means include an annular front washer and an annular rear washer respectively, said front frictional interface formed between said front washer and said front sun gear being a planar surface perpendicular to said rotational axis, said rear frictional interface formed between said rear washer and said rear sun gear being a conical surface, an area of said rear frictional interface being larger than that of said front frictional interface.

8. A center differential for four-wheel drive vehicles according to claim 7, in which an outer diameter of said front washer is equal to that of said rear washer.

9. A center differential for four-wheel drive vehicles according to claim 2, in which said first friction generator means and said rear friction generator means include an annular front washer and an annular rear washer respectively, a coefficient of friction of a frictional interface formed between said rear washer and said rear sun gear being larger than that of a frictional interface formed between said front washer and said front sun gear.

10. A center differential for four-wheel drive vehicles according to claim 9, in which an outer diameter of said front washer is equal to that of said rear washer.

11. A center differential for four-wheel drive vehicles according to claim 1, in which said helical teeth of said front sun gear is helically twisted in the same helical direction as said helical teeth of said rear sun gear in order to generate a force for pushing said front sun gear toward said rear sun gear in a coast driving mode of the vehicle.

* * * * *

UNITED STATES PATENT AND TRADEMARK OFFICE
CERTIFICATE OF CORRECTION

PATENT NO.   : 5,735,766

DATED        : April 7, 1998

INVENTOR(S)  : Sacchettini et al.

It is certified that an error appears in the above-identified patent and that said Letters Patent is hereby corrected as shown below:

In the Claims:

In Claim 1, line 7, change "read" to --rear--.

Signed and Sealed this

Eleventh Day of August 1998

Attest:

BRUCE LEHMAN

Attesting Officer

Commissioner of Patents and Trademarks